May 1, 1928.
A. J. BERG
1,668,534
METHOD OF SECURING METAL FINS TO TUBES
Filed Aug. 6, 1926        2 Sheets-Sheet 2
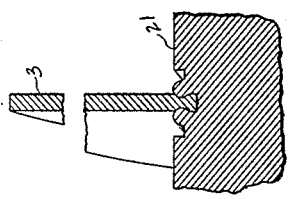
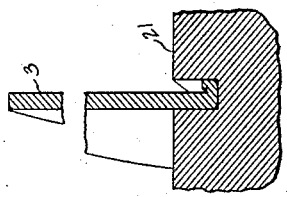
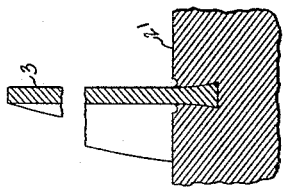
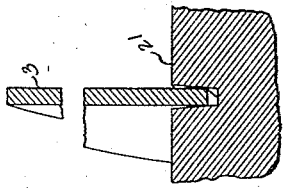
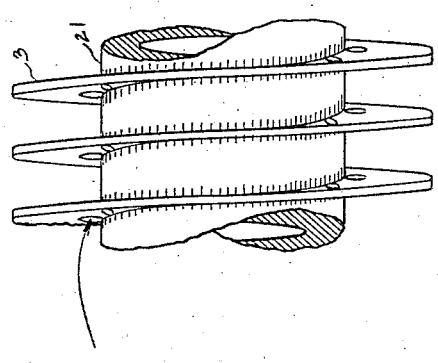
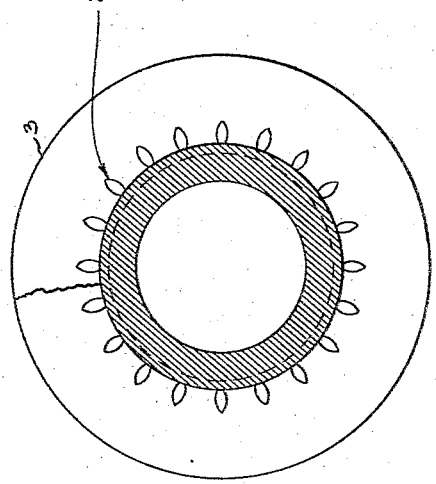
Inventor
Alfred J. Berg
By Robert A. Lavender
Attorney Patented May 1, 1928.

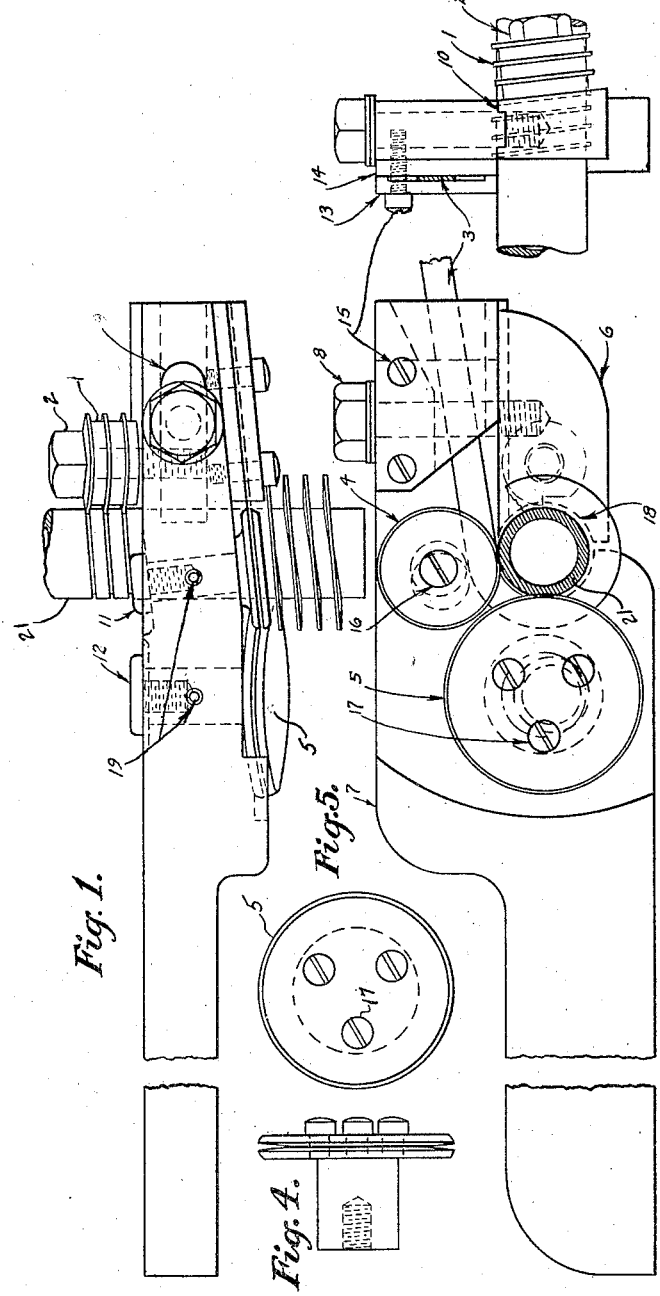

1,668,534

UNITED STATES PATENT OFFICE.

ALFRED J. BERG, OF PORTSMOUTH, NEW HAMPSHIRE, ASSIGNOR OF ONE-THIRD TO PAUL F. FOSTER, OF THE UNITED STATES NAVY, AND ONE-THIRD TO JOHN O. HUSE, OF BALTIMORE, MARYLAND.

METHOD OF SECURING METAL FINS TO TUBES.

Application filed August 6, 1926. Serial No. 127,692.

My invention relates to a method and apparatus for securing metal heat radiating flanges on tubes or cylinders, and is a continuation-in-part of my application Serial No. 12,656 filed March 2, 1925.

The object of my invention is to provide an effective yet inexpensive tool or apparatus for securing a strip of metal about and in the periphery of a cylindrical member, whereby the degree of heat transfer therebetween is increased.

Another object of my invention is to provide a method of securing a strip of metal about and in the periphery of a cylindrical member that is rapid in operation and applicable to quantity production.

A further object of my invention is to provide a firm fin-joint that requires no brazing or soldering material or other additional securing means.

Heretofore in cylinders of the finned type, it has been customary to either cast the fin integral with the cylinder or in the case of heat radiating strip is mechanically fastened to the tube or cylinder, to weld or braze the abutting surfaces together. The casting method involves the disadvantage of expensive patterns and molding apparatus and the production of brittle material. The welding and brazing method is slow, tedious and expensive and often fails to give a sufficiently rigid and efficient joint to allow a ready transference of heat.

My invention, however, insures a physical contact between the main body and the heat radiating fin at such a pressure as to provide a most efficient heat conducting joint and at the same time a mechanically strong joint superior to welding.

Reference is to be had to the accompanying drawings forming a part of this specification in which like reference characters indicate corresponding parts throughout the several views, and in which:

Figures 1, 2 and 3 represent respectively, the plan, elevational and end views of my combined groove forming, strip inserting tool, Figures 4 and 5 show in detail the side and end views of the crimp wheel, Figures 6, 7, 8, and 9 illustrate, in cross-section, several methods of operation for securing the fin within the groove, and Figures 10 and 11 show the end and side views respectively, of a tube having a spirally formed fin in place.

Referring more particularly to Figs. 1, 2, and 3, numeral 1 indicates one type of groove former consisting of a triple grooving cutter rigidly secured to tool body 7 by means of tap bolt 2. The function of the cutter will be described in detail later.

Numeral 3 denotes the metal fin forming strip free to move in a direction parallel to the tool body. The strip is guided in a vertical plane by passing it between flat metal plates 13 and 14 attached to the tool body by screws 15, plate 13 having a flat countersunk portion to accommodate the thickness of strip.

Reference character 4 designates a lead wheel preferably consisting of two metallic disks, spaced apart approximately the thickness of the ribbon or strip. These disks are free to rotate upon a bearing passing transversely to the tool body to which it is attached by means of thrust member 11 and screw 16. As shown in Fig. 1, this bearing is not normal to the length of tool body 7 but is placed at an angle thereto for reasons to be stated.

The crimp wheel, 5, shown in detail in Figs. 4 and 5, is made up of two rotating disks secured together by means of screws 17, one of said disks having a bearing member held within the tool body by thrust screw 12. The axis of rotation of the crimp wheel is inclined, when considered in the vertical plane, causing the wheel to tilt upwardly, as best seen in Figure 1. As shown in Figure 4, I prefer to chamfer the two contacting surfaces of the crimp wheel disks to such an angle as will loosely accommodate a fin after being placed upon a tube.

The tool body proper consists of wrought steel member 7 cut at one end to fit a standard tool post and tapered in thickness at the other end to an angle coinciding with that defined by the space between the lead wheel disks which in turn is determined by the horizontal progression of the fin along the surface of the cylinder.

Intermediate the ends of tool body 7, see Figures 1 and 2, I have illustrated a flat portion cut to furnish a bearing surface for crimp wheel 5. Under the forward end of the tool, a tongue and groove arrangement 10 alines the back rest member 6 in a vertical plane. This member has an arcuate portion cut out at one end corresponding to the curvature of the tube or cylinder 21 and is square threaded as shown by dotted line 18 to clear any burr raised in forming the grooves, as will be explained later. In addition to supporting the tube it provides an inclined bearing surface for cutter 1 as best shown in Figure 3.

Rigid connection is made between the tool body and member 6 by means of clamp screw 8 passing through slot 9. The tool body has an arcuate portion cut transversely to correspond with that in the back rest member, the combined arcs completing a circle having a diameter slightly larger than that of tube 21.

At 19, I have indicated oil holes for lubricating the bearing surfaces of the lead and crimp wheels.

The manner of operation of my device is as follows:

The tool body is rigidly fastened in the tool post of a standard lathe equipped with thread cutting gear. The tube or cylinder to be finned is placed between lathe centers in the usual manner. Upon the machine starting, the triple groove cutter is moved to cut into the cylinder the required depth.

This tool is of the stepped type, each successive cutter penetrating to a greater depth so that one passage completely finishes the helical groove. The cutter may be of a shape to form a groove having parallel side walls as shown in Figure 8, or a groove having slightly divergent side walls as shown in Figure 6. The groove shown in Figure 8 is of greater width than the groove shown in Figure 6. The purpose of increasing the width of the groove will later become apparent. Also as will become apparent, the groove shown in Figure 6 may be formed with parallel side walls if desired.

As illustrated to advantage in Figure 2 the metal ribbon 3 may be led from a suitable carrier such as a spool or the like (not shown) and passed between the guide plates 13 and 14. The strip may be extended into the peripheral groove of lead wheel 4, and with the tube 21 rotating in the proper direction, the operation of the apparatus may proceed. With the cutters or groove formers 1 arranged to provide a groove such as shown in Figure 6, and the wheel 4 arranged so that its fin or strip receiving groove is in alignment with the spiral groove formed by the members 1, the wheel 4 operates to serve two purposes, first, that of bending the strip 3 to the contour of the tube 21, and secondly, that of forcing the inner edge of the strip 3 into the prepared groove. These actions of the wheel 4 are carried out simultaneously as clearly illustrated in Figure 2. In fact, it may be said, that the bending operation of the strip occurs simultaneously with its insertion into the groove prepared in the tube. The bending of the strip into spiral form causes the inner edge thereof to thicken appreciably, which thickening takes place during the time the edge is being forced into the groove of the tube. This operation is best illustrated in Figures 6 and 7. As shown in these figures the strip 3 is inserted into the groove in tube 21 and as it is bent and as its inner edge is forced against the bottom of the groove, the edge is upset and thickened, forcing the strip into intimate contact with the side walls of the groove. When certain materials of strip and tubes are used, the sides of the groove may be actually forced outward, as shown particularly in Figure 7. The upsetting of the inner edge of the strip 3 forms an exceedingly tight joint between the tube and the fin. The union provided is in the form of a dove-tail joint. The joint obviates any possibility of the tube releasing the fin, and permits heat to pass from the tube to the fin with substantially the same rapidity or efficiency as in the case when the fin is made integral with the tube. The joint between the tube and fin or strip secured by the operation heretofore described is clearly illustrated in Figure 7.

By regulating the angular relation of the wheel 4 to the groove in the tube 21 the manner in which the inner edge of the strip or fin engages the side walls of the groove may be controlled. If the wheel 4 is inclined as shown in Figure 2 the joint shown in Figure 8 may be obtained.

In this operation, the inner edge of the fin is turned upon itself as illustrated. This is due to the reason that as the fin or strip 3 enters the groove, the inner edge of the strip engages with a side wall of the groove and turns upon itself.

It is also to be understood that the expansion in thickness of the metal about the inner edge of the strip is utilized in obtaining the joint shown in Figure 8. This expansion takes place while the fin is being pressed into the groove and during the period the inner edge of the fin is being turned upon itself. The expansion of the metal about the inner edge of the fin or strip during the bending thereof added to the upsetting of the inner edge of the strip produces a joint between the tube and fin of great strength and durability.

The crimping wheel 5 follows the operation of the lead wheel 4. The wheel 5 straddles the fin and its peripheral edges exert a pressure against the metal of the tube lying adjacent to the sides of the fin. The pressure of the wheel 5 may be adjusted so that sufficient metal is depressed along the edges of the fin receiving groove of the tube to seal the outer side walls of the groove against the adjacent walls of the fin as shown to advantage in Figure 7.

Sufficient pressure may be given wheel 5 to press the metal of the tube adjacent to the side walls of the fin to the extent shown in Figure 9. In this latter case the portion of the fin contiguous with the outer edges of the groove is depressed and the metal about the inner edge of the fin further expanded. This added expansion of the metal about the inner edge of the fin presses outwardly to a greater degree the bottom portion of the walls of the fin receiving groove and produces a joint similiar to that shown in Figure 9. In this last mentioned method the joint between the fin and the tube, is strengthened. Also the joint produced has a high heat conducting efficiency, the same as is the case with the joints shown in Figures 7 and 8.

In Figures 10 and 11, I have shown a section of a finned tube complete. At 20, I have indicated a series of prick-punch indentions equally spaced around the tube to constitute a securing means additional to that gained by knurling or plain rolling. The use of these indentions is purely optional.

While I have shown and described specific shapes of joints obtained by a definite relation between the diameter of the lead and crimp wheels with respect to that of the tube, in addition to the relative positions of the wheels and the pressure with which they operate either upon the strip or the metal adjacent the strip, the type of joint may be modified to meet a given condition by changing the above relations. It is also apparent that the cutting of groove may be done by a tool separate and distinct from the strip laying device or the knurler.

I do not limit or confine myself to the precise details of construction and method of operation herein described and delineated, as modification and variation may be made within the scope of the claims without departing from the spirit of the invention.

The product herein and produced by this method forms the subject matter of my copending application, Serial No. 251,589 and the apparatus shown herein forms the subject matter of my copending application, Serial No. 249,404, divisional applications hereof.

Having thus described my invention what I claim is:

1. The method of forming a heat radiator tube which comprises forming a groove about the tube, inserting an edge of a strip into the groove, and upsetting the edge of the strip against the sides of the groove.

2. The method of forming a heat radiator tube which comprises forming a groove about the tube, and inserting an edge of the strip into the groove and upsetting the edge of the strip within the groove.

3. The method of forming a heat radiator tube which comprises forming a groove about the tube, inserting an edge of a strip into the groove, upsetting the edge of the strip against the sides of the groove and crimping the edges of the groove.

4. The method of providing a tube with a heat radiating fin which comprises forming a continuous groove about the tube, inserting an edge of the fin into the groove, and upseting the edge of the fin against the bottom and the sides of the groove.

5. The method of providing a tube with a heat radiating fin which comprises forming a groove about the tube, inserting an edge of a fin into the groove at an angle to engage a side wall of the groove, and upsetting the edge of the fin within the groove.

6. The method of forming a heat radiator tube which consists in forming a groove about the tube and then coiling about the tube with its edge in the groove a thin strip of metal of substantial width compared with the diameter of the tube whereby the coiling of the strip on the tube produces a thickening of the edge of the strip within the groove and produces a good heat-conducting contact between the strip and the tube.

ALFRED J. BERG.